United States Patent

Watanabe et al.

[11] Patent Number: 5,353,879
[45] Date of Patent: Oct. 11, 1994

[54] DOOR HAVING SMOKE REDUCING APPARATUS ASSOCIATED THEREWITH

[75] Inventors: Shigeo Watanabe, Gifu; Kenji Okazaki, Ichinomiya; Niichi Hayashi, Hashima; Teruo Yamada, Nagoya, all of Japan

[73] Assignee: Kabushiki Kaisha Nagao Kogyo, Nagoya, Japan

[21] Appl. No.: 111,399

[22] Filed: Aug. 25, 1993

Related U.S. Application Data

[62] Division of Ser. No. 629,627, Dec. 18, 1990, abandoned.

[30] Foreign Application Priority Data

Dec. 18, 1989 [JP] Japan ............................... 1-327796
Dec. 18, 1989 [JP] Japan ............................... 1-327797
Dec. 18, 1989 [JP] Japan ............................... 1-327798
Dec. 18, 1989 [JP] Japan ............................... 1-327800

[51] Int. Cl.$^5$ ............................................. A62C 2/06
[52] U.S. Cl. .................................. 169/52; 169/48; 169/54; 169/51; 169/64; 49/70; 239/289; 239/695
[58] Field of Search ............... 169/9, 48, 52, 54, 61, 169/62, 64, 70; 49/70; 239/69, 289, 695; 222/146.6, 160

[56] References Cited

U.S. PATENT DOCUMENTS

| | | | |
|---|---|---|---|
| 538,016 | 4/1895 | Dunham | 169/9 |
| 2,078,097 | 4/1937 | Radzinsky | 49/70 X |
| 2,341,437 | 2/1944 | Getz | 169/61 |
| 2,858,903 | 11/1958 | Goetz et al. | 261/18.1 |
| 3,750,161 | 7/1973 | Teeters | 169/61 |
| 4,141,698 | 2/1979 | Kihlstedt et al. | 55/10 |
| 4,703,891 | 11/1987 | Jackson et al. | 239/695 |
| 4,741,403 | 5/1988 | Nishimura | 169/61 |

OTHER PUBLICATIONS

Kirk–Othmer, "Encyclopedia of Chemical Technology," Third Edition, Supplement vol. (1984) pp. 450–455.

Primary Examiner—David M. Mitchell
Assistant Examiner—Andrew C. Pike
Attorney, Agent, or Firm—Oblon, Spivak, McClelland, Maier & Neustadt

[57] ABSTRACT

A door includes an apparatus for reducing smoke associated therewith. The door is particularly advantageous in reducing smoke in a fire to thereby allow a firefighter or a victim trapped in a fire to readily indentify an exit. The door includes a nozzle or plurality of nozzles mounted upon the door, with a liquid source connected to the nozzle. Preferably, the door additionally includes a supply of pressurized water therein, with a surface active agent in an amount of 0.1 to 3,000 ppm disposed in the supply of pressurized water 13 Claims, 17 Drawing Sheets

DE-SMOKING EFFECT OF ANIONIC SURFACE ACTIVE AGENT "NEOPELEX F-25"

DE-SMOKING EFFECT OF ANIONIC SURFACE ACTIVE AGENT "EMUL 2F NEEDLE"

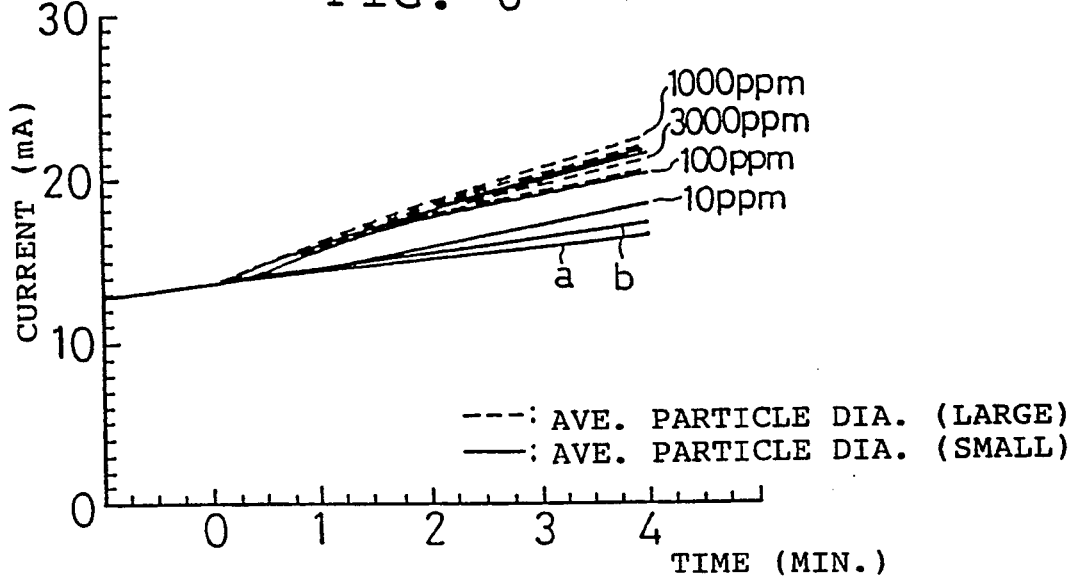
DE-SMOKING EFFECT OF AMPHOTERIC SURFACE ACTIVE AGENT "ANHYTOL 20 N"
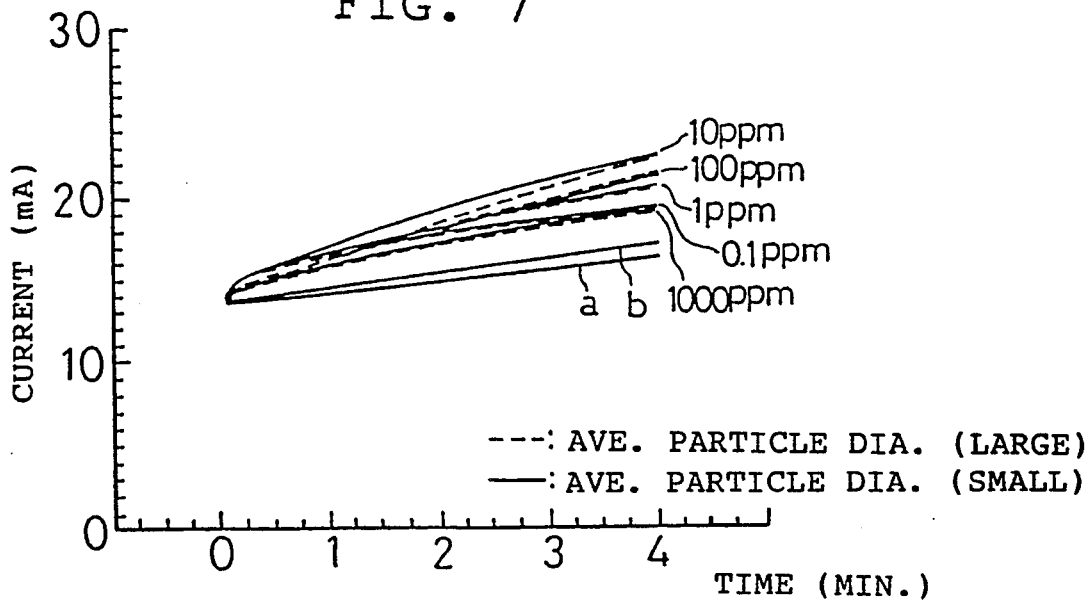
DE-SMOKING EFFECT OF CATIONIC SURFACE ACTIVE AGENT "SUNNY-SOL C"

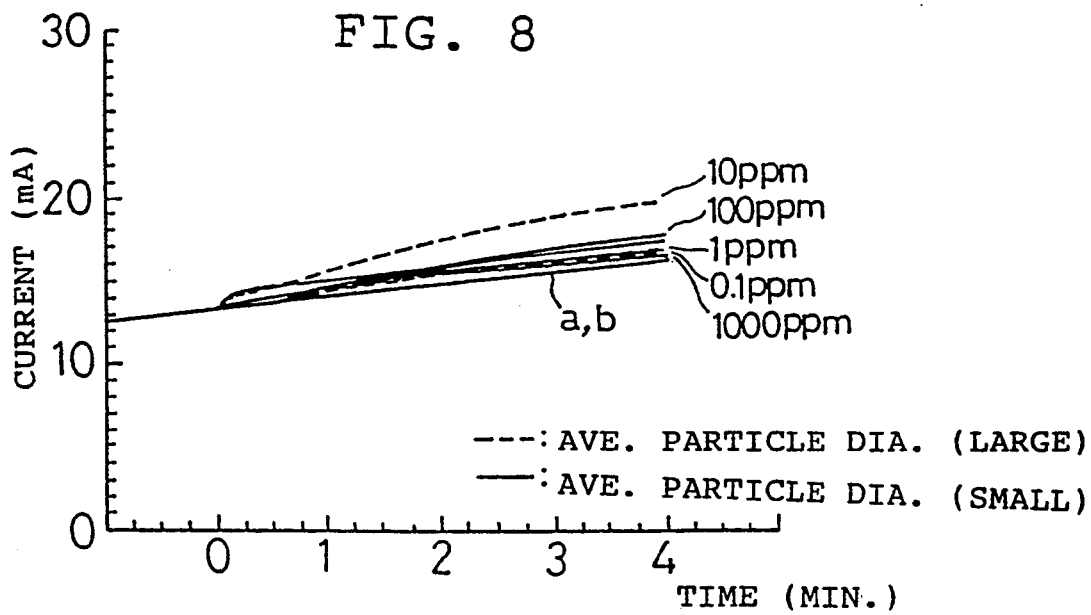
DE-SMOKING EFFECT OF CATIONIC SURFACE ACTIVE AGENT "KOHTAMINE 24P"
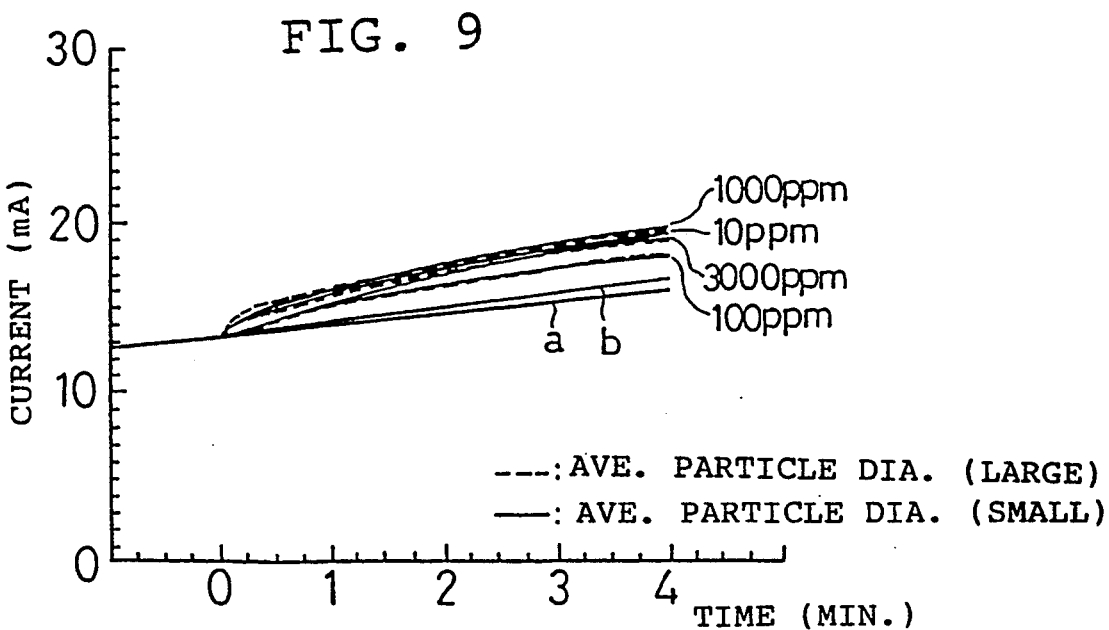
DE-SMOKING EFFECT OF NONIONIC SURFACE ACTIVE AGENT "EMULGEN 120"

DE-SMOKING EFFECT OF NONIONIC SURFACE ACTIVE AGENT "EMULGEN .909"

"SUNNY-SOL C"/SPRAYING TIME: 26 SEC.

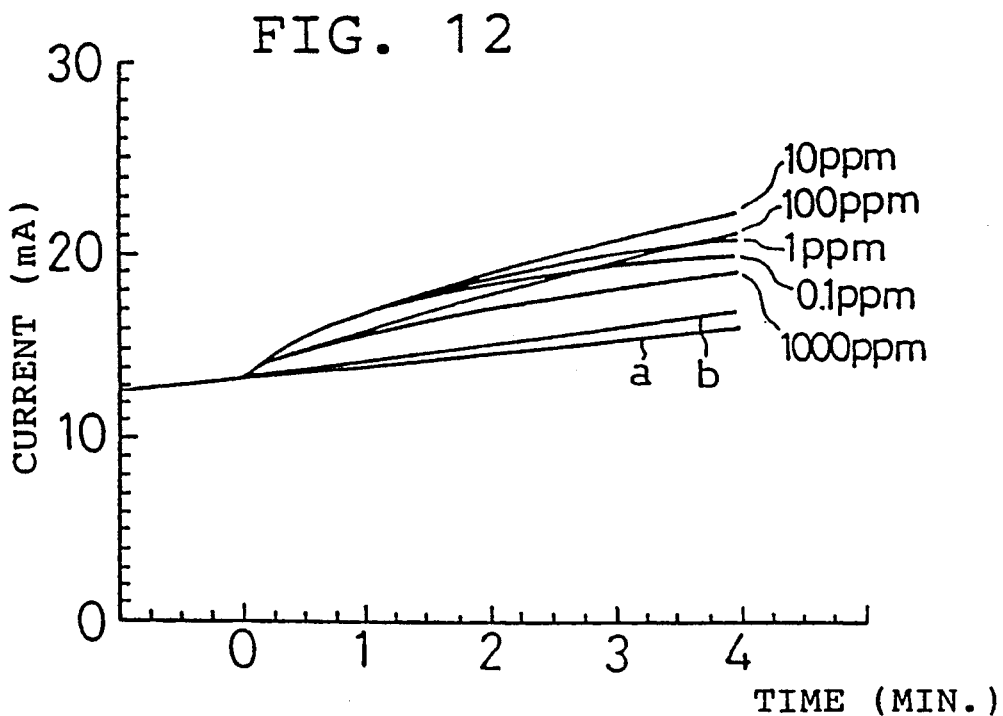
"SUNNY-SOL C"/SPRINKLER/SMALL AVE. PARTICLE DIA.
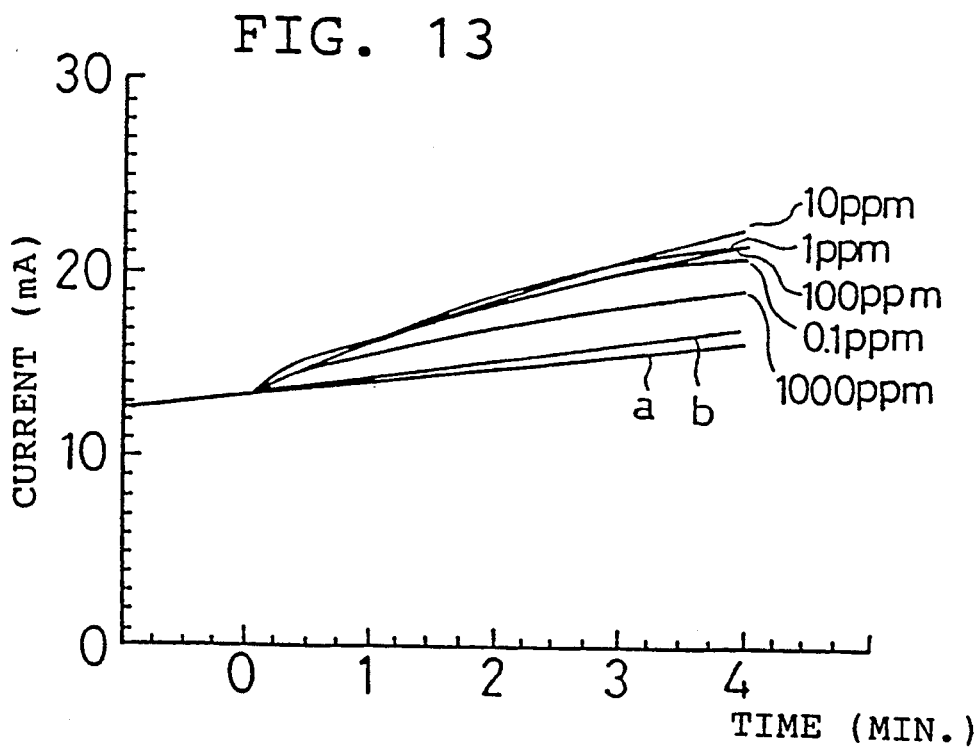
"SUNNY-SOL C"/SPRINKLER/LARGE AVE. PARTICLE DIA.

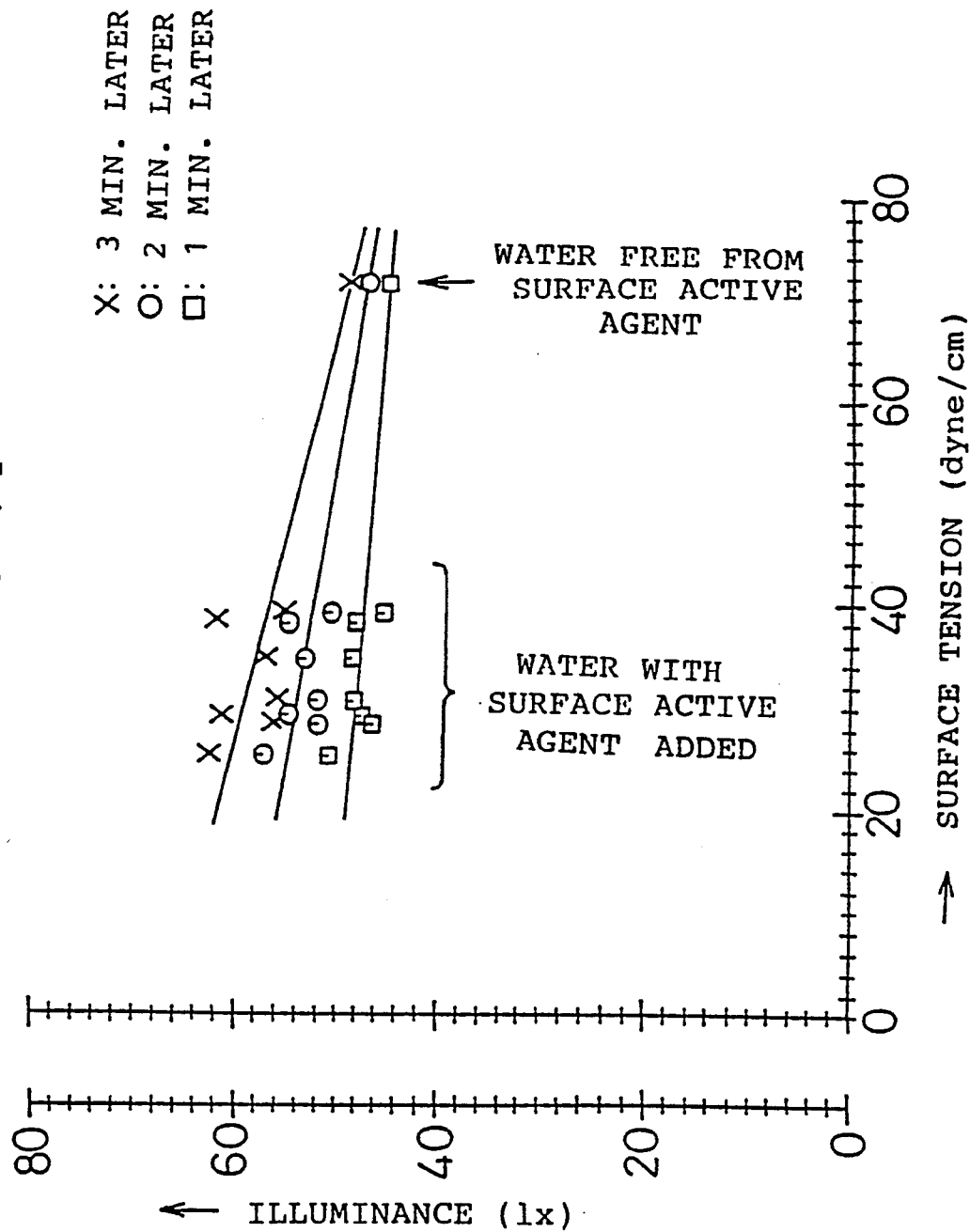

FIG. 17
FIG. 18
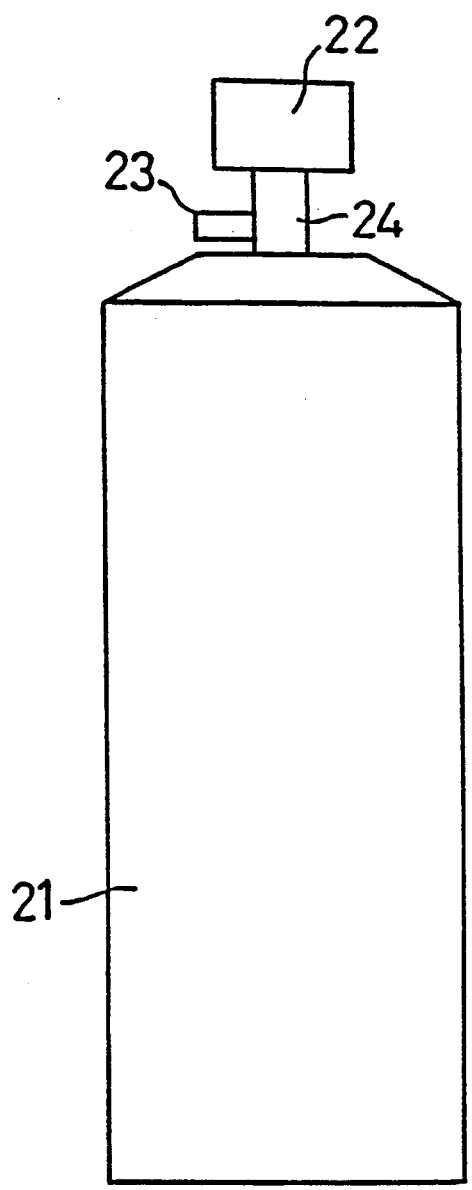
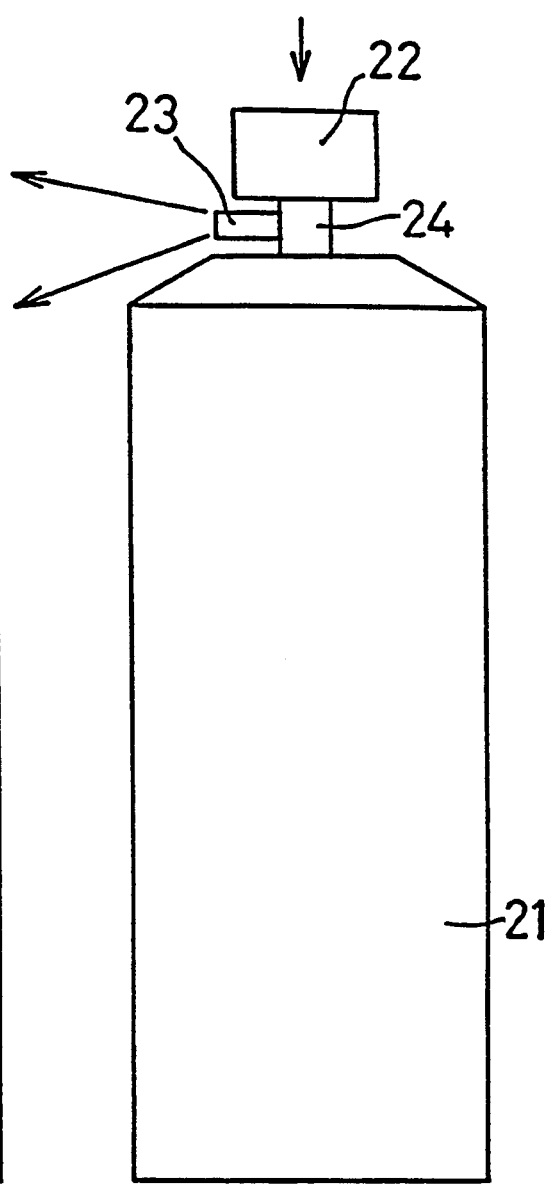

DOOR HAVING SMOKE REDUCING APPARATUS ASSOCIATED THEREWITH

This application is a division of application Ser. No. 07/629,627, filed on Dec. 18, 1990, now abandoned.

BACKGROUND OF THE INVENTION

1. Field of the Invention

The present invention relates to various apparatuses for descending micro floating particles, whereby micro floating particles in gases are sedimented and separated. The present invention is especially suitable for collecting dusts from exhaust gases, de-smoking during fires and the like.

2. Description of the Prior Art

A water shower apparatus has been used in order to separate and collect harmful or useful micro floating particles in gases, such as dusts, glass fibers, carbon powders and the like. The water shower apparatus sprays water to gases including air thereby depositing micro floating particles onto water droplets, and sediments and collects the micro floating particles.

Although the water shower apparatus deposits the micro floating particles onto water droplets and sediments them, it has a disadvantages that it should spray a large amount of water to the gases in order to improve the efficiency of the particles separation and collection. This is because the micro floating are less likely to wet in general. The consumption of the large amount of water makes it hard to recollect the micro floating particles from the water. Additionally, the large amount of water cools the gases, thereby adversely affecting the evacuation of the gases to the outdoors.

Further, human damages in recent building fires have been caused mainly by smokes generating during the fires. Men lost their visibility and could not escape from the fires because there arises a large amount of smokes from building materials in an initial period of the fires.

As for means for protecting men from the smokes in the building fires, the following have been used: a fireproof door for shutting off smoke intrusion into an emergency way such as a fire escape stair and the like, an exhaust fan for detecting generation of smokes and evacuating the smokes to the outdoors, a de-smoking apparatus of an electrostatic collector type for charging smoke particles by corona discharge and collecting them on an electrode (i.e., usually on a wall surface of buildings), and so on.

However, the fireproof door simply shuts off the smokes locally. Accordingly, men lose their visibility and can hardly breathe at places filled up with the smokes. Further, it is impossible to suppress the concentrations of the smokes to a safe level with the exhaust fan at every place of buildings in view of the capacity of the exhaust fan. Similarly, the de-smoking apparatus of an electrostatic collector type is especially suitable for de-smoking locally. However, it is also impossible to de-smoke with the de-smoking apparatus at every place of buildings in view of the capacity of the de-smoking apparatus.

SUMMARY OF THE INVENTION

The present invention has been developed in view of the above-described circumstances. Accordingly, it is an object of the present invention to provide a water shower type apparatus for descending micro floating particles which has high efficiency of the particles separation and collection. It is another object of the present invention to provide an economical means for quickly de-smoking when fires occur and smokes fill up every place of buildings.

The above and other object can be carried out by an apparatus for descending micro floating particles. The apparatus comprises:

a noble for spraying water into a space in which micro floating particles to be collected are present; and a highly pressurized water supplying means for pressurizing water with a surface active agent added in an amount of 0.1 to 3000 ppm and supplying the water to the nozzle.

When a high voltage is applied to the nozzle of the apparatus for spraying the water, water droplets to be sprayed can be charged, e.g., usually in a positive charge. In general, since the micro floating particles such as smoke is charged in a positive or negative charge (in a negative charge for most cases), the descendability of the micro floating particles and the de-smokability, i.e., the removability of the smoke, can be improved when the water droplets to be sprayed are charged in an opposite charge.

It is preferred that most of the water droplets to be sprayed has an average particle diameter falling within a range of 0.01 to 5 mm. When the average particle diameter is greater than the upper limit, the descendability and the de-smokabiiity cannot be improved sufficiently in spite of an increasing water consumption amount. When the average particle diameter is less than the lower limit, the descending velocities of the water droplets decrease to deteriorate the descendability and the de-smokability.

As for the surface active agent, either one of a cationic surface active agent, an anionic surface active agents an amphoteric surface active agent and a nonionic surface active agent may be used. It is especially preferred to employ the cationic surface active agent which is suitable for adsorbing the micro floating particles such as smoke charged in a negative charge.

As for a concentration of the cationic surface active agent, it is preferred to adjust the concentration to fall within a range of 1 to 100 ppm. As for a concentration of the anionic surface active agent, it is preferred to adjust the concentration to fall within a range of 1 to 100 ppm. As for a concentration of the amphoteric surface active agent, it is preferred to adjust the concentration to fall within a range of 10 to 3000 ppm. As for a concentration of the nonionic surface active agent, it is preferred to adjust the concentration to fall within a range of 10 to 3000 ppm. When the concentrations deviate the ranges, the descendability and the de-smokability are improved less.

It is preferred to adjust a surface tension of the water droplets to be 40 dyne/cm or less. It is further preferred to adjust the surface tension to be 30 dyne/ore or less. Generally speaking, the less the surface tension is adjusted, the greater the descendability and the de-smokability are improved.

BRIEF DESCRIPTION OF THE DRAWINGS

A more complete appreciation of the present invention and many of the attendant advantages thereof will be readily obtained as the same becomes better understood by reference to the following description when considered in connection with the accompanying drawings, wherein:

FIG. 6 illustrates current or visibility-time characteristic curves showing results of a visibility recovery experiment in which water with an amphoteric surface active agent added was sprayed;

FIG. 7 illustrates current or visib ility-time characteristic curves showing results of a visibility recovery experiment in which water with a cationic surface active agent added was sprayed;

FIG. 8 illustrates current or visibility-time characteristic curves showing results of a visibility recovery experiment in which water with another cationic surface active agent added was sprayed;

FIG. 9 illustrates current or visibility-time characteristic curves showing results of a visibility recovery experiment in which water with a nonionic surface active agent added was sprayed;

FIG. 12 illustrates current or visibility-time characteristic curves showing results of a visibility recovery experiment in which water with a cationic surface active agent added was sprayed with a nozzle of a commercially available sprinkler and an average particle diameter of the water was fixed at a predetermined value;

FIG. 13 illustrates current or visibility-time characteristic curves showing results of a visibility recovery experiment in which water with a cationic surface active agent added was sprayed and an average particle diameter of the water was at a predetermined value which is greater than that of the visibility recovery experiment illustrated in FIG. 12;

FIG. 14 illustrates characteristic curves showing how illuminance depends on surface tension of water with a surface active agent added in a visibility recovery experiment in which the water was sprayed.

FIG. 17 illustrates a side view of a Fifth Preferred Embodiment (i.e., a portable de-smoking apparatus) of an apparatus for descending micro floating particles according to the present invention;

FIG. 18 illustrates a side view of the portable de-smoking apparatus in service;

PREFERRED EMBODIMENTS OF THE INVENTION

Having generally described the present invention, a further understanding can be obtained by reference to certain specific preferred embodiments which are provided herein for purposes of illustration only and are not intended to be limiting unless otherwise specified.

First Preferred Embodiment

The First Preferred Embodiment of an apparatus for descending micro floating particles according to the present invention will be hereinafter described with reference to FIG. 1. This apparatus is used for an exhaust gas dust collector, and disposed in a gas duct.

Figure 1:
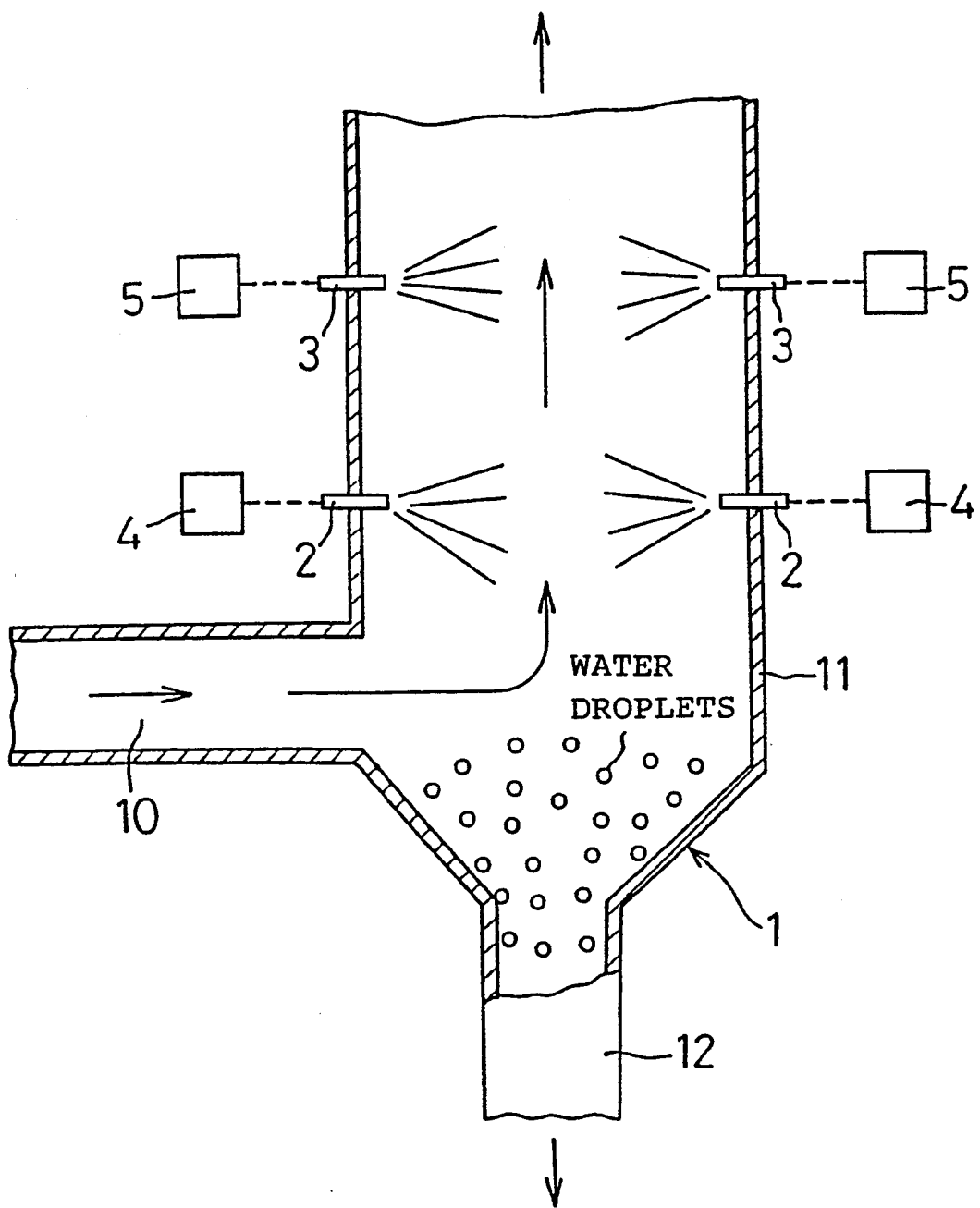
FIG. 1 illustrates a cross sectional view of a major portion of a First Preferred Embodiment of an apparatus for descending micro floating particles according to the present invention.

As FIG. 1 illustrates a major portion of the apparatus for descending micro floating particles, the apparatus comprises a collector cylinder 1, first nozzles 2 and second nozzles 3 disposed on side walls of the collector cylinder 1, first highly pressurized water supplying means 4 for pressurizing and supplying water to the first nozzles 2, and second highly pressurized water supplying means 5 for pressurizing and supplying water to the second nozzles 3.

The collector cylinder 1 includes an inlet cylinder portion 10 opened at both ends thereof and disposed horizontally, a main cylinder portion tl opened at both ends thereof vertically at an outlet opening end of the inlet cylinder portion 10, and a water droplets collector cylinder portion 12 extending from a lower opening end of the main cylinder portion 10. An inlet opening end of the inlet cylinder portion t0 is connected to a garbage furnace (not shown) by way of a gas duct (not shown). And an upper opening end of the main cylinder portion 11 is connected to a chimney (not shown). Further, a lower opening end of the water droplets collector cylinder portion 12 is connected to a pool (not shown) for storing the water droplets.

The first highly pressurized water supplying means 4 pressurize water with a cationic surface active agent added in an amount of 3 ppm and supply the water to the first nozzles 2. And the second highly pressurized water supplying means 5 pressurize water with an anionic surface active agent in an amount of 3 ppm and supply the water to the second nozzles 3.

The first nozzles 2 are disposed on side walls at a lower portion of the main cylinder portion 11, and spray water droplets into the inside of the main cylinder portion 11. Further, a configuration of the first nozzles 2 and a discharge pressure of the first highly pressurized water supplying means 4 are designed so that most of the water droplets has an average particle diameter of 0.1 min.

The second nozzles 3 are disposed on side walls at an upper portion of the main cylinder portion 11, and spray water droplets into the inside of the main cylinder portion 11. Further, a configuration of the second nozzles 3 and a discharge pressure of the second highly pressurized water supplying means 5 are designed so that most of the water droplets has an average particle diameter of 0.5 min.

The apparatus for descending micro floating particles operates as follows. The exhaust gas generated in the garbage furnace (not shown) is exhausted to the outdoors by way of the gas duct (not shown), the inlet cylinder portion 10, the main cylinder portion 11 and the chimney (not shown).

The water with the cationic surface active agent added is pressurized and supplied to the first nozzles 2 by the first highly pressurized water supplying means 4, and sprayed into the lower portion of the main cylinder portion 11. As a result, dusts in the exhaust gas are adsorbed onto sprayed water droplets, and sedimented together with the water droplets into the water droplet collector portion 12. Since the cationic surface active agent is added in the water droplets, surface tension of the water droplets decreases to improve wettability of the water droplets to the dusts. Accordingly, efficiency of the dust collecting operation has been improved. In general, since the dusts are charged negatively for most cases and since the water droplets are positively charged by the cationic surface agent, the dusts and the water droplets are attracted by electrostatic attraction force. Consequently, the dust collectability has been further improved.

The water with the anionic surface active agent added is pressurized and supplied to the second nozzles 3 by the second highly pressurized water supplying means 5, and sprayed into the upper portion of the main cylinder portion tl. As a result, dusts in the exhaust gas are adsorbed onto sprayed water droplets, and sedimented together with the water droplets into the water droplet collector portion 12. Since the anionic surface active agent is added in the water droplets, surface tension of the water droplets decreases to improve wettability of the water droplets to the dusts. Accordingly, efficiency iof the dust collecting operation has been improved. In addition, since the water droplets sprayed frown the second nozzles 3 are charged negatively by the anionic surface active agent and since the water droplets sprayed from the first nozzles 2 are positively charged by the cationic surface active agent, the negatively charged water droplets and the positively charged water droplets remaining in the exhaust gas are combined and grown into larger particles. Consequently, the water droplets with the dusts adsorbed can be sedimented quickly. In addition, since the positively charged water droplets sprayed by the second nozzles 3 have a greater diameter relatively, they do not remain in the exhaust gas nor they are evacuated to the outdoors through the chimney.

In this way, even in the case that the positively charged water droplets are made relatively finer particles to decrease the sedimentation velocity, the positively charged water droplets can be collected favorably. Namely, since the water droplets charged negatively and having a greater average diameter are sedimented from the upper space to the lower space in which the positively charged water droplet remain, the positively charged water droplets and the negatively charged water droplets are adsorbed with each other by the electrostatic attraction force and the low surface tension.

Further, it is possible to obviate the second nozzles 3 and the second highly pressurized water supplying means 5 in the First Preferred Embodiment. Furthermore, it is possible to add an amphoteric surface active agent or a nonionic surface active agent to the water instead of the cationic surface active agent and the anionic surface active agent in the First Preferred Embodiment.

Second Preferred Embodiment

Figure 2:
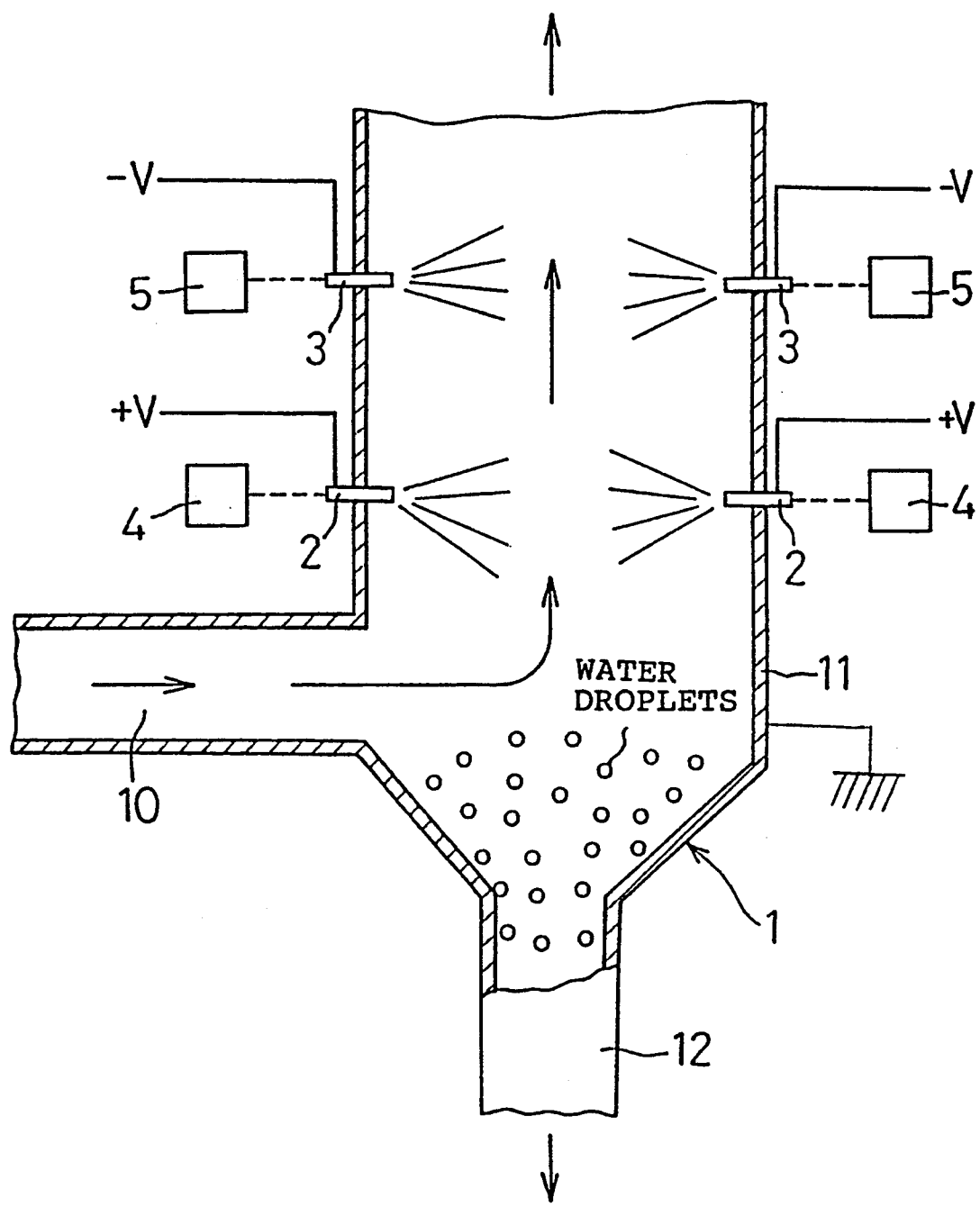
FIG. 2 illustrates a cross sectional view of a major portion of a Second Preferred Embodiment of an apparatus for descending micro floating particles according to the present invention.
Figure 3:
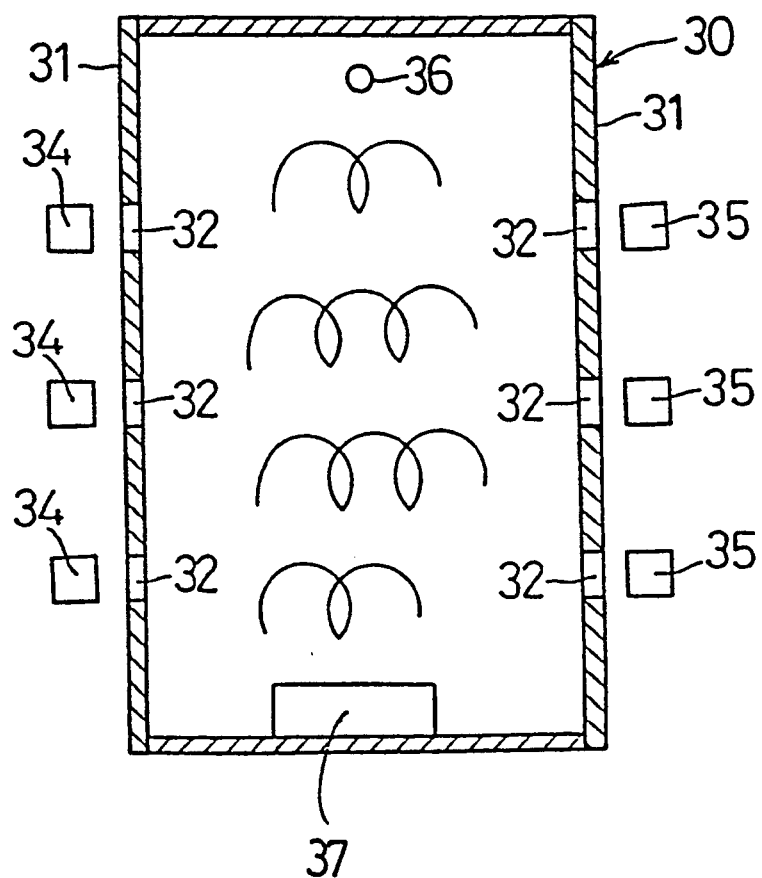
FIG. 3 illustrates a cross sectional view of an experimental apparatus for verifying advantages of the present invention.
Figure 4:
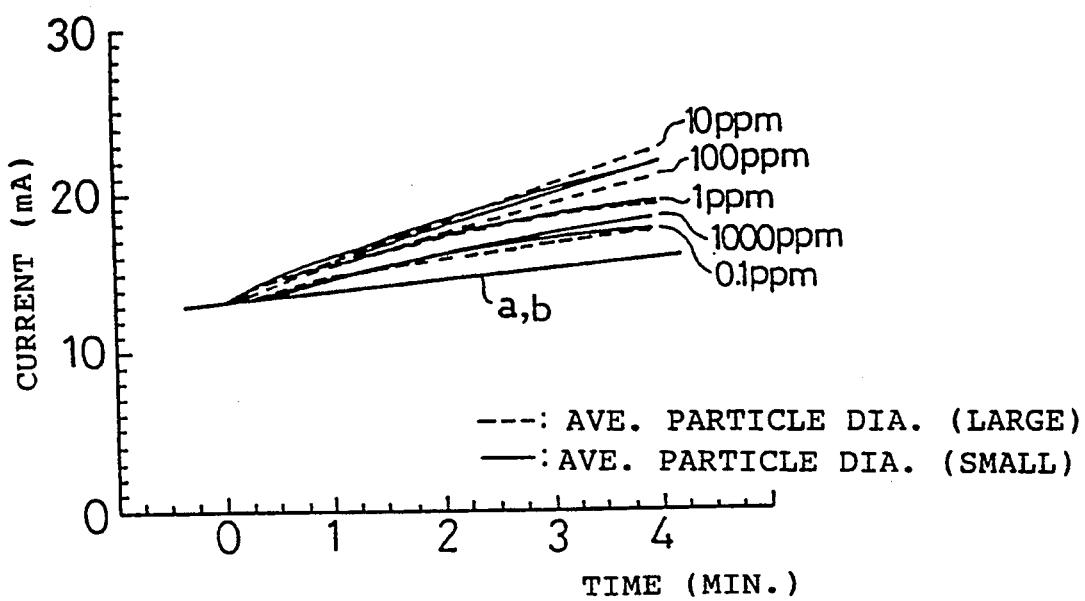
FIG. 4 illustrates current or visibility-time characteristic curves showing results of a visibility recovery experiment in which water with an anionic surface active agent added was sprayed.
Figure 5:
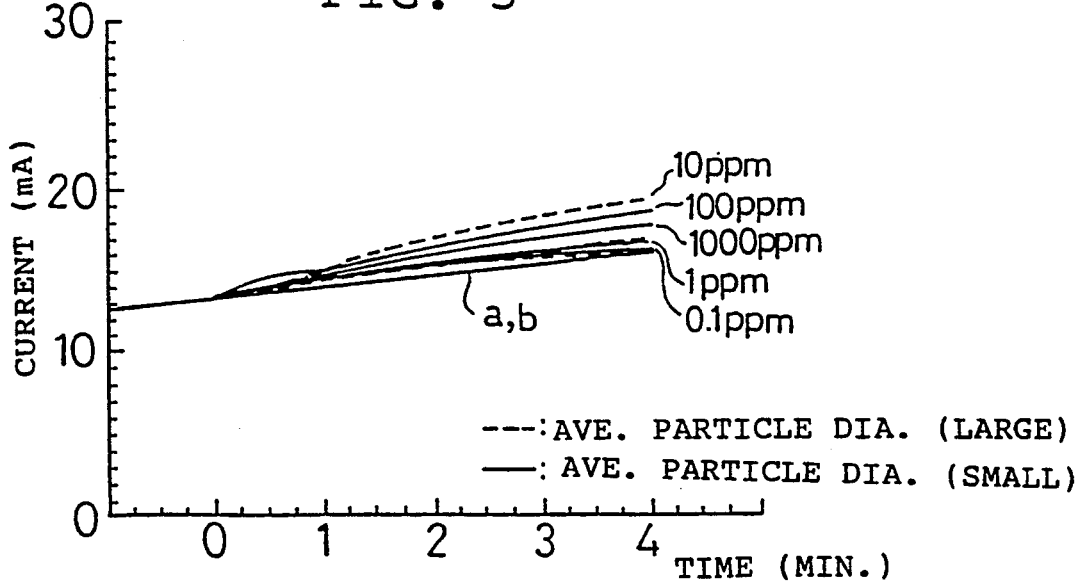
FIG. 5 illustrates current or visibility-time characteristic curves showing results of a visibility recovery experiment in which water with another anionic surface active agent added was sprayed.
Figure 10:
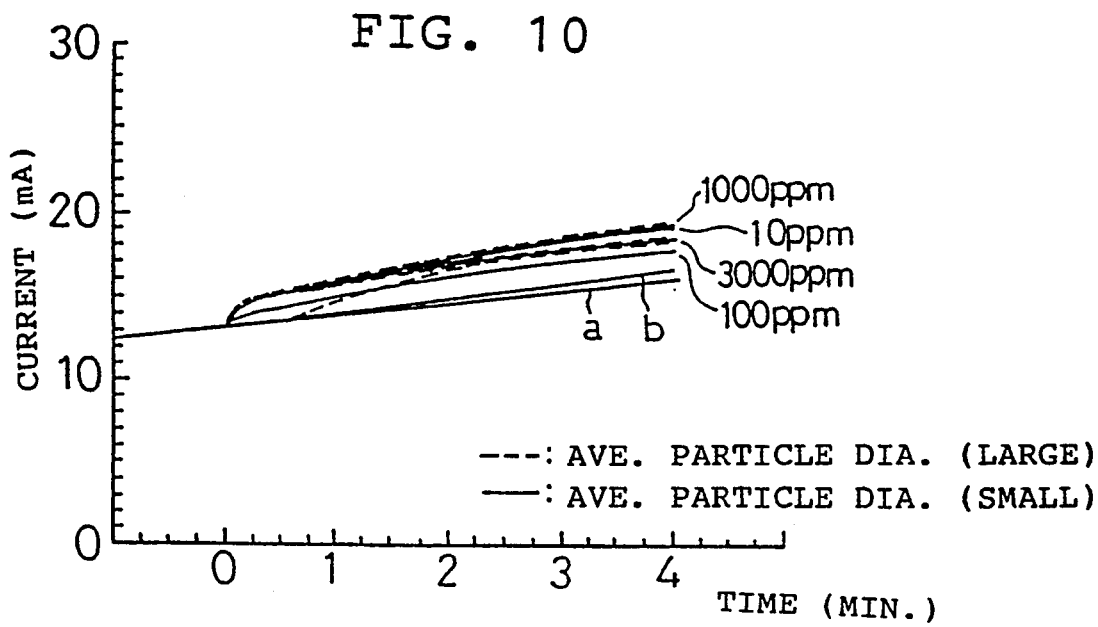
FIG. 10 illustrates current or visibility-time characteristic curves showing results of a visibility recovery experiment in which water with another nonionic surface active agent added was sprayed.

The Second Preferred Embodiment of an apparatus for descending micro floating particles according to the present invention will be hereinafter described with reference to FIG. 2. In this apparatus, the following arrangements are further added to the First Preferred Embodiment of the apparatus illustrated in FIG. 1. Namely, a positive high voltage of approximately 10 kV is applied to the first nozzles 2 and a negative high voltage of approximately −10 kV is applied to the second nozzles 3. Here, the main cylinder portion 11 is grounded, and the first nozzles 2 and the second nozzles 3 are insulated from the main cylinder portion 11.

When such additional arrangements are employed, the positively charged water droplets are charged further positively and the negatively charged dusts can be collected further favorably. Likewise, the negatively charged water droplets are charged further negatively and the positively charged water droplets can be collected further favorably.

Third Preferred Embodiment

Figure 15:
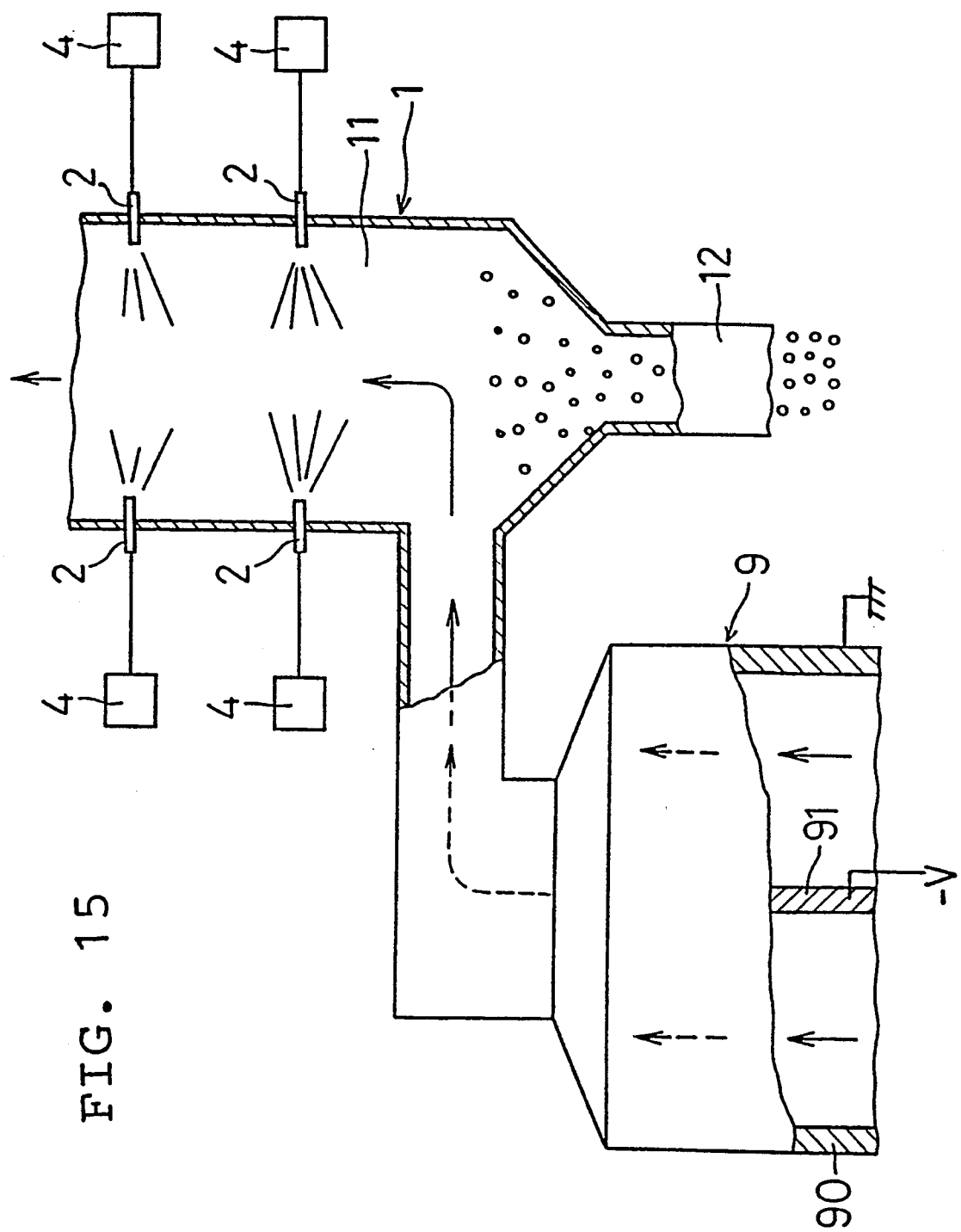
FIG. 15 illustrates a cross sectional view of a major portion of a Third Preferred Embodiment of an apparatus for descending micro floating particles according to the present invention.

The Third Preferred Embodiment of an apparatus for descending micro floating particles according to the present invention will be hereinafter described with reference to FIG. 15. This apparatus is characterized in that the First Preferred Embodiment of the apparatus illustrated in FIG. 1 is connected at an outlet port of an electric dust collector 9. In addition, the second nozzles B and the second highly pressurized water supplying means 5 are obviated in the Third Preferred Embodiment of the apparatus.

The electric dust collector 9 is one of cylindrical types, a cylindrical side wall 90 thereof works as an electrode to be grounded, and a central electrode 91 thereof extending along the central axis thereof works as a high voltage electrode. A high negative voltage is applied to the high voltage electrode 91 in order to generate corona discharge between the electrodes, thereby generating negative ions. The negative ions charge the dusts negatively to deposit the dusts onto the cylindrical side wall 90.

Thus, the dusts remaining in the exhaust gas are heavily charged negatively and are combined with the water with the cationic surface active agent added, which is charged positively and sprayed by the first nozzles 2, further favorably by the electrostatic attraction force. Hence, the duct collectability has been improved in the Third Preferred Embodiment of the apparatus.

Fourth Preferred Embodiment

Figure 16:
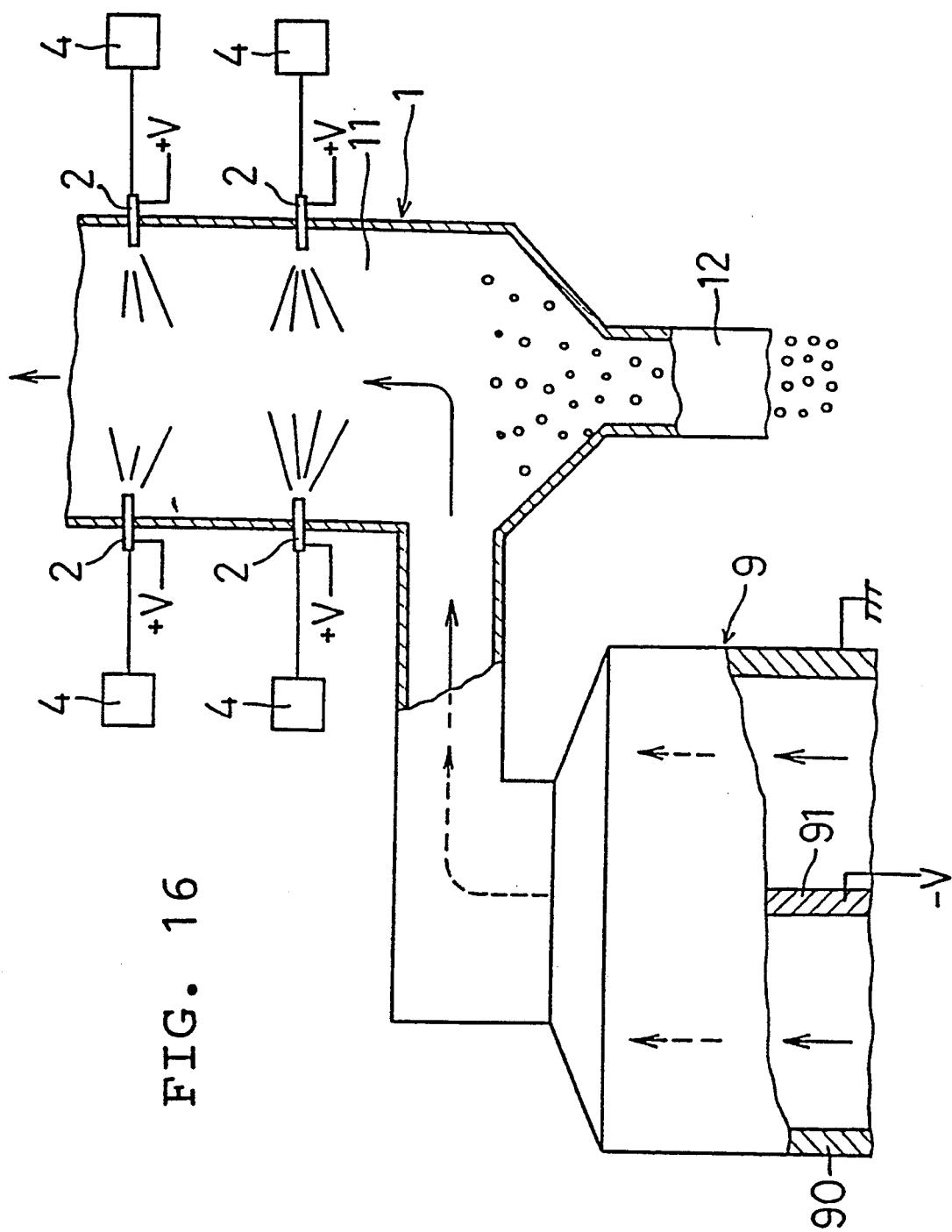
FIG. 16 illustrates a cross sectional view of a major portion of a Fourth Preferred Embodiment of an apparatus for descending micro floating particles according to the present invention.

The Fourth Preferred Embodiment of an apparatus for descending micro floating particles according to the present invention will be hereinafter described with reference to FIG. 16. In this apparatus, the following arrangement is further added to the Third Preferred Embodiment of the apparatus illustrated in FIG. 15. Namely, a positive high voltage is applied to the first nozzles 2. Hence, the water droplets are charged further positively. Accordingly, the dust collectability for collecting the negatively charged dusts has been further improved.

Figure 11:
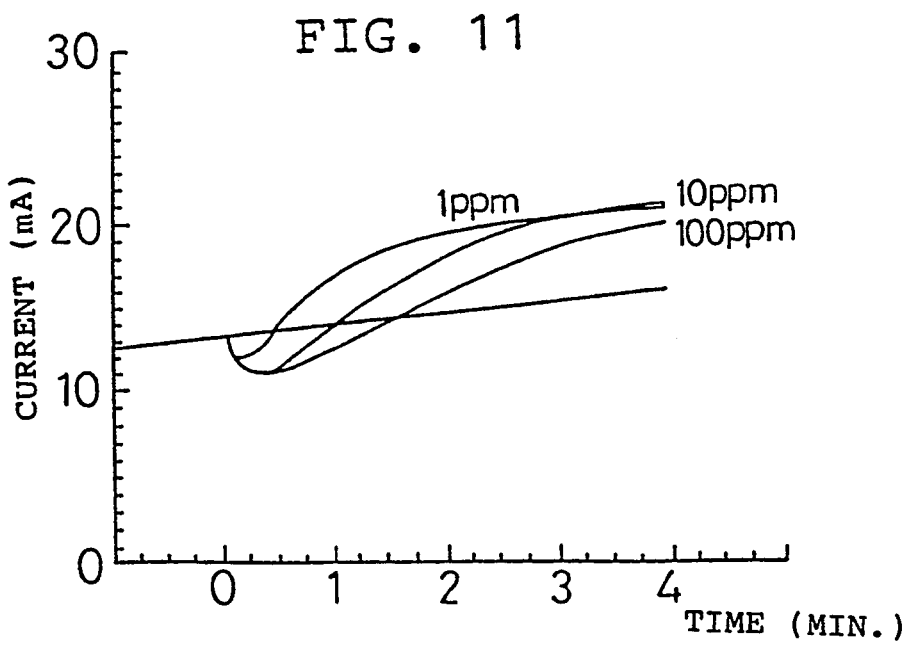
FIG. 11 illustrates current cr visibility-time characteristic curves showing results of a visibility recovery experiment in which water with a cationic surface active agent added was sprayed and an average particle diameter of the water was fixed at a predetermined value.

As having been described so far, since the First through Fourth Preferred Embodiments of an apparatus for descending micro floating particles according to the present invention spray the water with the surface active agent added in the amount of 0.1 to 3000 ppm to the micro floating particles, the First through Fourth Preferred Embodiments can give the recoverability of the micro floating particles far superior to that of the conventional water shower type apparatus.

De-smoking Experiment

In order to verify a dust collecting effect obtained by spraying the water added with a surface active agent, a de-smoking experiment were carried out as follows.

In the de-smoking experiment, an experimental apparatus as illustrated in FIG. 3 was employed. The experimental apparatus was an enclosed container 30 having a width of 340 cm, a height of 120 cm and a depth of 60 cm. In two (2) side walls 31, 31 facing each other, three (3) small openings 32 were formed at predetermined positions, respectively. In the small openings 32, objective lenses (not shown) were disposed, and an optical axes of the paired objective lenses agreed with each other. In FIG. 3, light emitting devices 34 were disposed on the optical axes on an outside of the left side wall 31, and similarly light receiving devices 35 were disposed on the optical axes on an outside of the right side wall 31. The light emitting devices 34 had a built-in incandescent lamp (not shown), and light emitted from the incandescent lamp was entered into the light receiving devices 35 by way of the paris of the objective lenses disposed in the right and left side walls 31, 31, and converted into an electric current. At an upper portion of the enclosed container 30, a nozzle 36 was disposed which held a water sample to be tested therein. At a bottom portion of the enclosed container 30, a smoke source 37 was disposed which included 6.1 grams of a mosquito insecticide.

The de-smoking experiment was carried out by spraying various water samples for a predetermined period of time after burning up the mosquito insecticide. Before carrying out the de-smoking experiment, namely before generating smokes an output current of the light receiving devices B5 was adjusted to 100 mA (equivalent to 300 1×approximately). The output current (i.e., illuminance) of the light receiving devices 35 are believed to be substantially in inverse proportion to the smoke concentration. Further, in the de-smoking experiment, the water samples were sprayed in an average particle diameter of 0.423 mm and 0.225 mm in an amount of 16.5 c.c. for 5 seconds. In FIGS. 4 through 10, the dotted line specifies the result of the de-smoking experiment in which the water samples were sprayed in the average diameter of 0.423 mm and the solid line specifies the de-smoking experiment in which the water samples were sprayed in the average diameter of 0.225 min. Further, the de-smoking experiment was carried out for the case where a water sample free from a surface active agent was sprayed (designated at "b" in FIGS. 4 through 10), and likewise for the case where nothing was sprayed (designated at "a" in FIGS. 1 through 10).

FIGS. 4 through 10 illustrate variations of the output current with respect to the time elapsed. It is apparent from FIGS. 4 through 10 that no substantial de-smoking effect was available in the case where the water sample free from a surface active agent was sprayed. Namely, in the case that the water sample free from a surface active agent was sprayed, the current increment (i.e., visibility recoverability) was substantially equal to that of the case where nothing was sprayed. It is also apparent from FIGS. 4 through 10 that the output current was increased remarkably by adding a surface active agent in an appropriate amount.

However, a concentration of the surface active agent giving an optimum de-smoking effect depends on a type of the surface active agent employed as follows:

As for the concentration of the anionic surface active agent, the concentration falls within a range of 0.1 to 3000 ppm preferably, and within a range of 10 to 100 ppm particularly. FIGS. 4 and 5 illustrate results of the de-smoking experiment where anionic surface active agents (i.e., "Neopelex F-25 (a trademark)" and "Emul 2F Needle (a trademark)" produced by Kao Co., Ltd. ) were employed.

As for the concentration of the amphoteric surface active agent, the concentration falls within a range of 0.1 to 3000 ppm preferably, and within a range of 10 to 3000 ppm particularly. FIG. 6 illustrates results of the de-smoking experiment where an amphoteric surface active agent (i.e., "Anhytol 2ON (a trademark)" produced by Kao Co., Ltd. ) was employed.

As for the concentration of the cationic surface active agent, the concentration falls within a range of 0.1 to 3000 ppm preferably, and within a range of 1 to 100 ppm particularly. FIGS. 7 and 8 illustrate results of the de-smoking experiment where cationic surface active agents (i. e., "Sunny-sol C (a trademark)" and "Kohtamine 24P (a trademark)" produced by Kao Co., Ltd. ) were employed. Additionally, "Sunny-sol C" gave a de-smoking effect superior to that of "Kohtamine 24P."

As for the concentration of the nonionic surface active agent, the concentration falls within a range of 1 to 3000 ppm preferably. FIGS. 9 and 10 illustrate results of the de-smoking experiment where nonionic surface active agents (i. e., "Emulgen 120 (a trademark)" and "Emulgen 909 (a trademark)" produced by Kao Co., Ltd. ) were employed. As illustrated in FIGS. 9 and 10, in the case of the nonionic surface active agent, the nonionic surface active agent shows a double-peak characteristic, namely it gives a high de-smoking effect in a low concentration range around 10 ppm as well as in a high concentration range around 1000 ppm.

Then, another de-smoking experiment was carried out in which "Sunny-sol C" (i.e., a cationic surface active agent) was employed and sprayed in an average particle diameter decreased to approximately 0.1 min. Results of the de-smoking experiment are illustrated in FIG. 11. In this de-smoking experiment, the water sample was sprayed in the amount of 16.5 c.c., but spraying time was extended to 26 seconds. Since the sprayed water had a very fine average particle diameter, the current dropped immediately after spraying and recovered thereafter as water droplets aggregated and sedimented. According to the results of this de-smoking experiment, it was found that the sprayed water droplets worked effectively when they had an average diameter of approximately 0.1 mm or more at least.

Further, a still another de-smoking experiment was carried out in which "Sunny-sol C" was employed and the configuration of the nozzle 36 was changed to that of a commercially available sprinkler. The water sample was sprayed in the amount of 16.5 c.c. for 5 seconds with the sprinkler. Results of the de-smoking experiment are illustrated in FIGS. 12 and 13. FIG. 12 illustrates the case where the sprayed water droplets had an average particle diameter of approximately 0.225 mm, and FIG. 13 illustrates the case where the sprayed water droplets had an average particle diameter of approximately 0.423 min. According to the results of the de-smoking experiment, it gas apparent that similar results were obtained in spite of the change in the nozzle 36.

Furthermore, a further de-smoking experiment gas carried out in order to examine relationships between water with a surface active agent added and surface tension as well as illuminance and also relationships between water free from a surface active agent and surface tension as well as illuminance. In this de-smoking experiment, the water samples were sprayed in an average particle diameter of approximately 0.178 mm in an amount of 16.5 c.c. for 5 seconds. Before spraying the water samples, the illuminance was adjusted to 40 1×. Results of the de-smoking experiment are illustrated in FIG. 14. The following is understood from FIG. 14: The less the water droplets exhibited surface tension, the quicker illuminance increment effect (i.e., visibility improvement effect) appeared.

According to the results of the above-described de-smoking experiments, the following are verified:

"Sunny-sol C," a cationic surface active agent, gives an excellent de-smoking effect. This is believed that the smoke particles are generally charged negatively and attracted to the positively charged cationic surface active agent thereby improving the adsorption effect.

In the case of the anionic surface active agent and the cationic surface active agent, a surface active agent having a benzene ring (e.g., "Sunny-sol C" in FIG. 7) is superior to a surface active agent free from a benzene ring (e. g., "Kohtamine 24P" in FIG. 8).

Fifth Preferred Embodiment

The Fifth through Tenth Preferred Embodiments of an apparatus for descending micro floating particles according to the present invention will be hereinafter described. The following preferred embodiments are various de-smoking apparatuses to which the micro floating particles descending principle of the present invention is applied.

The Fifth Preferred Embodiment will be hereinafter described with reference to FIGS. 17 and 18. As illustrated in FIG. 17, it is a portable de-smoking apparatus comprising a portable pressure container 21 including a nozzle 23, a highly pressurized liquefied carbon dioxide gas (not shown) filled in the portable pressure container 21, and water with a cationic surface active agent added in an amount of 3 ppm and filled in the portable pressure container 21.

The portable pressure chamber 21 has a cylindrical can shape, and the nozzle 23 including a push button 22 is disposed at one end thereof. As illustrated in FIG. 18, a valve (not shown) disposed in a base 24 of the nozzle 23 is opened up to spray the water in the portable pressure container 21 through the nozzle 23 when the push button 22 is pressed. On the contrary, the valve ts closed by a built-in spring (not shown) disposed in the base 24 when the push button 22 is not pressed. Since the construction and operation of the portable pressure container 21 called as a sprat can are well known, they will not be described herein.

An average particle diameter of the water droplets sprayed through the nozzle 23 depends on a spraying pressure and a configuration of the nozzle 23, however, it is preferred that the average particle diameter oF most of the water droplets falls within a range of 0.01 to 0.5 mm in ordinary usage.

Sixth Preferred Embodiment

Figure 19:
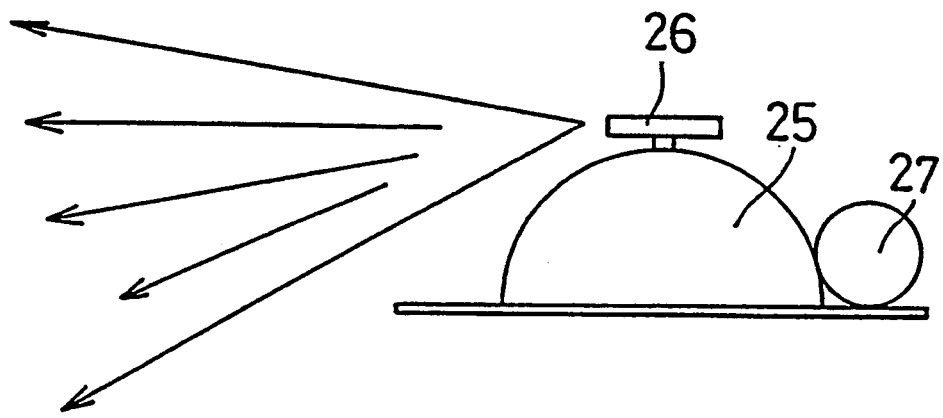
FIG. 19 illustrates a side view of a Sixth Preferred Embodiment (i.e., a portable de-smoking apparatus) of an apparatus for descending micro floating particles according to the present invention.

The Sixth Preferred Embodiment will be hereinafter described with reference to FIG. 19. As illustrated in FIG. 19, it is a portable de-smoking apparatus and designed to be suitable for equipment for a fireman who dares to go into violent smoke. The portable de-smoking apparatus comprises a helmet 25, a nozzle 26 isposed at a top of the helmet 25, and a high pressure bomb 27 connected to the nozzle 26 by way of a valve (not shown) and a hose (not shown).

The high pressure bomb 27 are installed to a rear of the helmet 25. A highly pressurized liquefied carbon dioxide gas (not shown) as well as water with "Sunnysol C" added in an amount of 3 ppm are filled in the high pressure bomb 27. When the valve is opened up, the water is heavily sprayed through the nozzle 26.

When a fireman puts on the helmet 25, he can move his hands freely and also he can automatically spray the water forward in accordance with the movements of his head. Thus, it is very helpful for a fireman to put on the helmet 25. Further, since an area filled up with smoke does not necessarily spread over a wide range in a usual fire, it is sufficient to spray the water for a couple of minutes. Accordingly, a size and a configuration of the high pressure bomb 27 can be changed freely in view of its appearance.

As having been described so far, since the Fifth and Sixth Preferred Embodiments (i.e., portable de-smoking apparatuses) comprise a portable pressure container including a nozzle in which water with a surface active agent added in an amount of 0.1 to 3000 ppm is filled together with a highly pressurized gas, a portable de-smoking apparatus can be realized which has not existed so far. Hence, it is possible for people to escape from fire more safely.

In addition, it is possible for a fireman to secure his visibility with the portable de-smoking apparatus, thereby enabling him an effective fire extinguishing and rescue activity. For instance, in the case that a hotel is provided with the portable de-smoking apparatuses at places adjacent to the doors of the hotel rooms, people can secure their visibility immediately before them at least and escape more easily by using the portable de-smoking apparatuses when a fire occurs and they have to escape through the hotel passages filled with smoke. Also, the de-smoking operation relieves the harmful action of the smoke against the eyes and breathing of the people.

Seventh Preferred Embodiment

Figure 20:
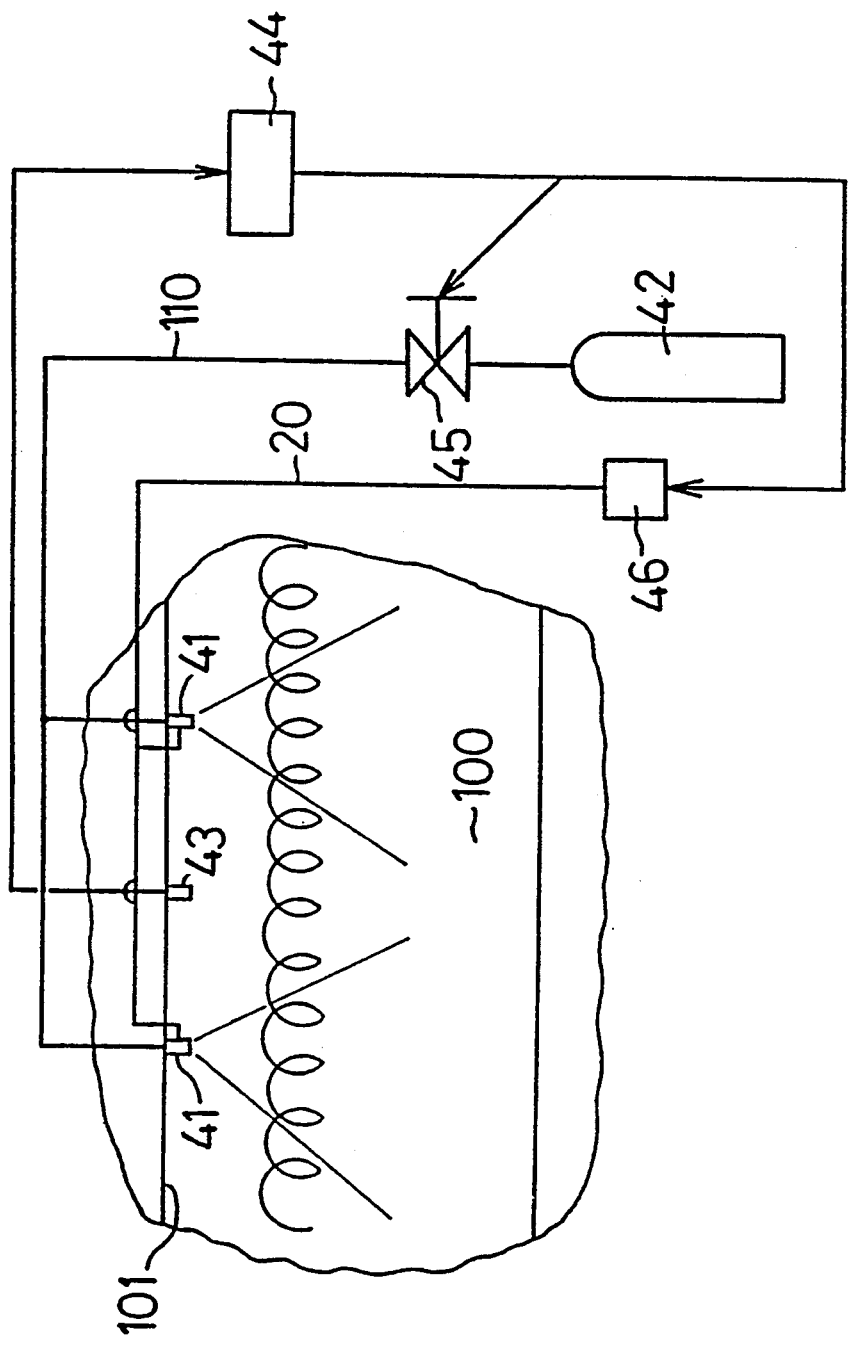
FIG. 20 illustrates a block diagram of a Seventh Preferred Embodiment ( i.e., a de-smoking apparatus ) of an apparatus for descending micro floating particles according to the present invention.

The Seventh Preferred Embodiment will be hereinafter described with reference to FIG. 20. It is a de-smoking apparatus a for de-smoking building passages, and comprises nozzles 41, a highly pressurized water supplying means 42, a smoke sensor 43, a judging means 44, a valve means 45 and a high voltage electric power source 46. The smoke sensor 43, the judging means 44 and the valve means 45 constitute a control means.

Specifically speaking, a plurality of the nozzles 41 is disposed on a ceiling portion 10! of a building passage 100, and connected to the highly pressurized water supplying means 42 by way of piping 110 and the valve means 45. In this de-smoking apparatus, the smoke sensor 43 is the one classified into a type which ionizes smoke particles between its electrodes and detects resistance between the electrodes, but a smoke sensor of the other type can be employed naturally, The valve means 45 includes a 2-way electromagnetic valve. The highly pressurized water supplying means 42 includes a bomb which is filled up with a highly pressurized liquefied carbon dioxide gas and water with a cationic surface active agent added in an amount of 3 ppm.

The judging means 44 includes a microcomputer apparatus, judges output currents from the smoke sensor 43, and outputs an operation signal to the valve means 45 and the high voltage electric power source 46 when a smoke concentration increases to a predetermined level or more.

An output terminal of the high voltage electric power source 46 connected to the nozzles 41 by way of an insulation-coated cable 20. The high voltage electric power source 46 outputs a high voltage, e.g., approximately +10 kv, to the nozzles 41 when the Judging means 44 inputs the operation signal thereto. Here, the nozzles 41 are connected to the piping 110 while being interposed by teflon seals (not shown). Thus, the high voltage is applied to the nozzles 41 only.

The operation of the thus arranged de-smoking apparatus will be hereinafter described. As smoke fills up the building passage 100, the smoke sensor 43 outputs signals corresponding to the smoke concentrations to the Judging means 44. When the smoke concentrations exceed a predetermined level, the judging means 44 outputs the operation signal to the valve means 45 and the high voltage electric power source 46. Then, the valve means 45 Opens, and the nozzles 41 spray particulate water droplets. The water droplets descend, thereby collecting smoke particles. The de-smoking apparatus thus reduces the smoke.

In the operation, since the water droplets are charged positively to a high degree, they collect the smoke particles charged negatively in general with the force. Further, since the cationic surface active agent is added to the water droplets in the amount of 3 ppm, the water droplets are more likely to wet the smoke particles than the water droplets free from the cationic surface active agent. Accordingly, the smoke particles collectability of the water droplets has been improved remarkably. This is believed as follows: The addition of the cationic surface active agent decreases the surface tension of the water droplets, thereby improving the wettability of the water droplets.

In addition, an average particle diameter of the water droplets sprayed from the nozzles 41 depends on a spraying pressure and a configuration of the nozzles 41, however, it is preferred that the average particle diameter of most of the water droplets falls within a range of 0.01 to 1 min.

Eighth Preferred Embodiment

Figure 21:
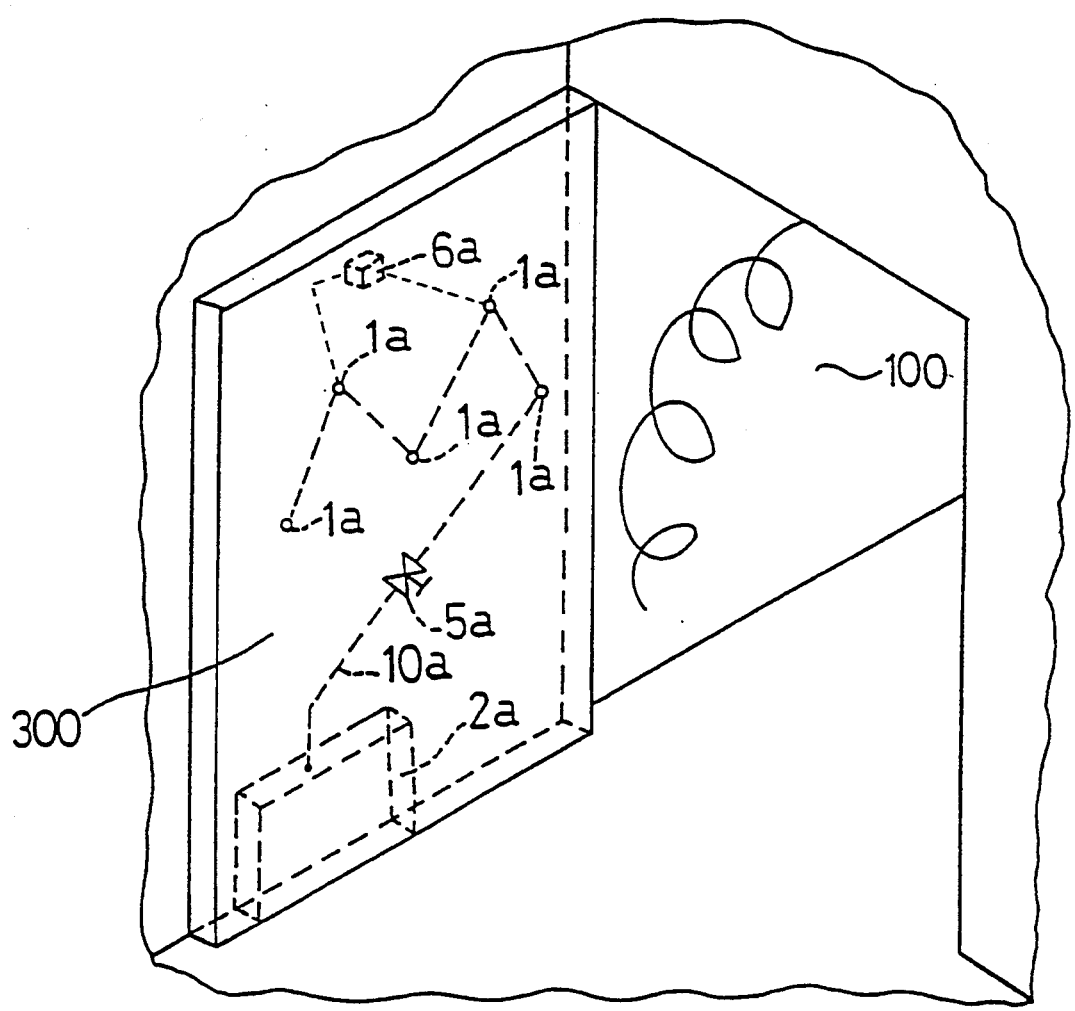
FIG. 21 illustrates a perspective view of an Eighth Preferred Embodiment ( i.e., a de-smoking apparatus ) of an apparatus for descending micro floating particles according to the present invention.

The Eighth Preferred Embodiment will be hereinafter described with reference to FIG. 21. It has arrangements identical to those of the Seventh Preferred Embodiment except that that nozzles 1a, a highly pressurized water supplying means 2a, a valve means 5a, piping 10a, and a high voltage electric power source 6a are incorporated in a fireproof door 300.

A plurality of the nozzles la is disposed at an upper portion of the fireproof door 300 on the both sides. The highly pressurized water supplying means 2a includes a thin-walled tank meeting a thickness of the fireproof door 300.

This de-smoking apparatus operates in a manner similar to the Seventh Preferred Embodiment basically. The smoke concentration signals output from a smoke sensor (not shown) actuate the de-smoking apparatus.

In the de-smoking apparatus, however, a judging means (not shown) outputs an operation signal to a door locking release mechanism (not shown) of the fireproof door 300 as well, and the door locking release mechanism accordingly closes the fireproof door 300. In this way, the de-smoking activity around conventional fireproof doors is made possible by adding the constituents of the present invention to the conventional fireproof doors, and accordingly the visibility of such conventional fireproof doors can be improved.

Ninth Preferred Embodiment

Figure 22:
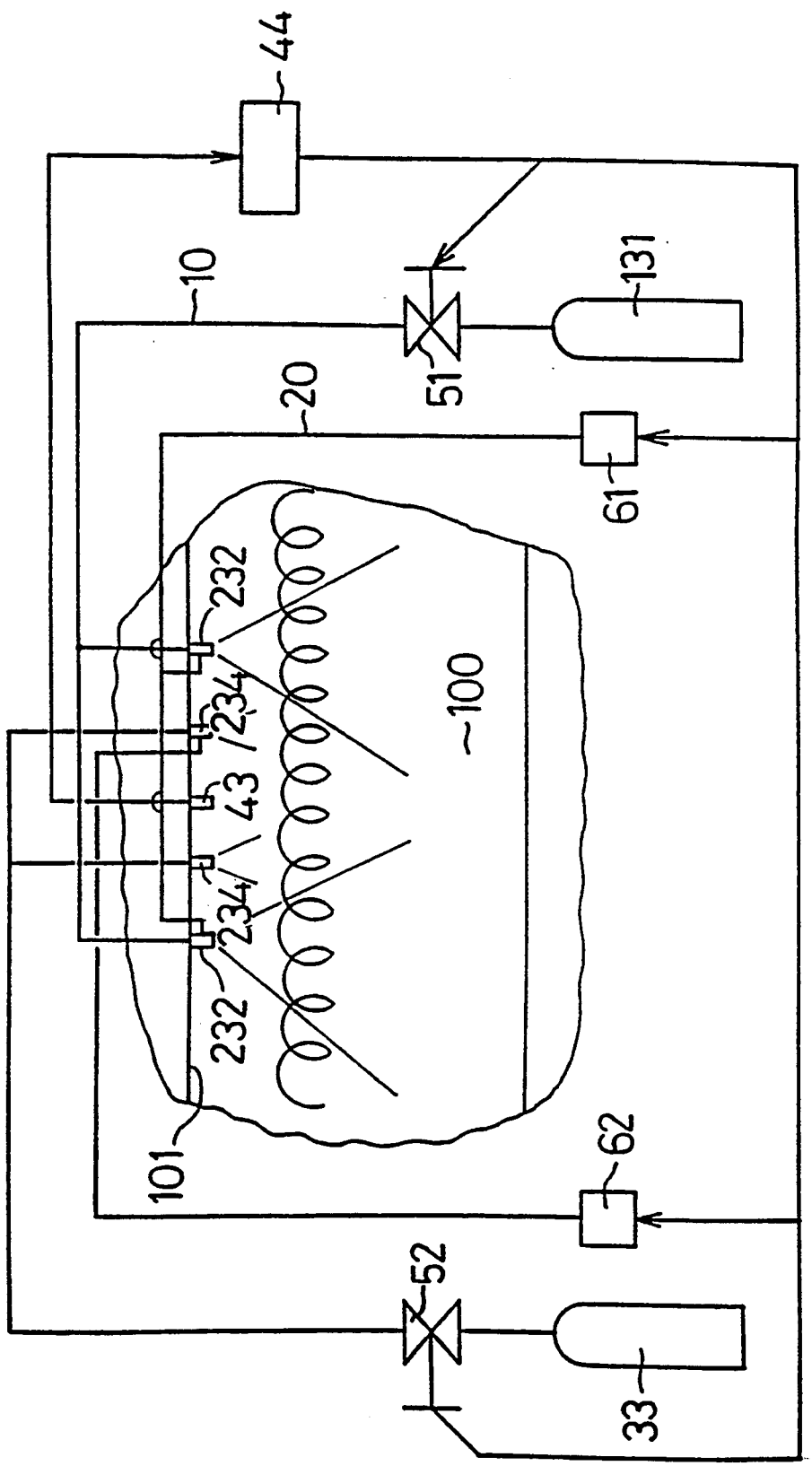
FIG. 22 illustrates a block diagram of a Ninth Preferred Embodiment (i.e., a de-smoking apparatus) of an apparatus for descending micro floating particles according to the present invention.

The Ninth Preferred Embodiment will be hereinafter described with reference to FIG. 22. It has arrangements identical to those of the Seventh Preferred Embodiment illustrated in FIG. 20 except that it includes two (2) kinds of nozzles ( i.e., first nozzles 232 and second nozzles 234), highly pressurized water supplying means (i.e., a first highly pressurized water supplying means 131 and a second highly pressurized water supplying means 33), valve means (i.e. a first means 51 and a second valve means 52) and high voltage electric power source (i.e., a first high voltage electric source 61 and a second high voltage electric power source 62).

The first highly pressurized water supplying means 131 supplies Water with a cationic surface active agent added to the first nozzles 232 by way of the first valve means 51, and the second highly pressurized water supplying means 33 supplies water with an anionic surface active agent added to the second nozzles 234 by way of the second valve means 52. The first nozzles 232 spray water droplets having a predetermined average particle diameter (e,g,, approximately 0.1 ram), and the second nozzles 234 spray water droplets having an average particle diameter (e.g., approximately 0.7 ram) which is greater than that of the water droplets sprayed by the first nozzles 232 or more. The first high voltage electric power source 61 applies a positive high voltage to the first nozzles 232, and the second high voltge electric power source 62 applies a negative high voltage to the second nozzles 234. It is well known that the average particle diameters of the water droplets depend on the constructions of the nozzles 232 and 234 and the hydraulic pressures of the water to be supplied.

In the thus arranged de-smoking apparatus, the smoke particles charged negatively in general are favorably adsorbed onto the finer water droplets with the cationic surface active agent added, and then the water droplets with the cationic surface active agent added are adsorbed onto the water droplets with the anionic surface active agent added which have the larger average particle diameter and a greater sedimentation velocity. Hence, the water droplets with the cationic surface active agent added are made finer, their total surface areas are increased, and their positive charges are dispersed more. Consequently, the smoke particles can be adsorbed onto the water droplets further favorably. In addition, in the case that the spraying of the water with the anionic surface active agent added are carried out retardingly with respect to the spraying of the water with the cationic surface active agent added, the water droplets with the cationic surface active agent added can fully adsorb the smoke particles and thereafter the water droplets with the anionic surface active agent added can quickly adsorb and sediment the water droplets with the cationic surface active agent added onto which the smoke particles have been adsorbed.

As having been described so far, since the Seventh, Eighth and Ninth Preferred Embodiments (i.e., de-smoking apparatuses) spray water with a surface active agent added in an amount of 0.1 to 3000 ppm in order to de-smoke, casualties in indoor fires can be reduced remarkably.

Tenth Preferred Embodiment

Figure 23:
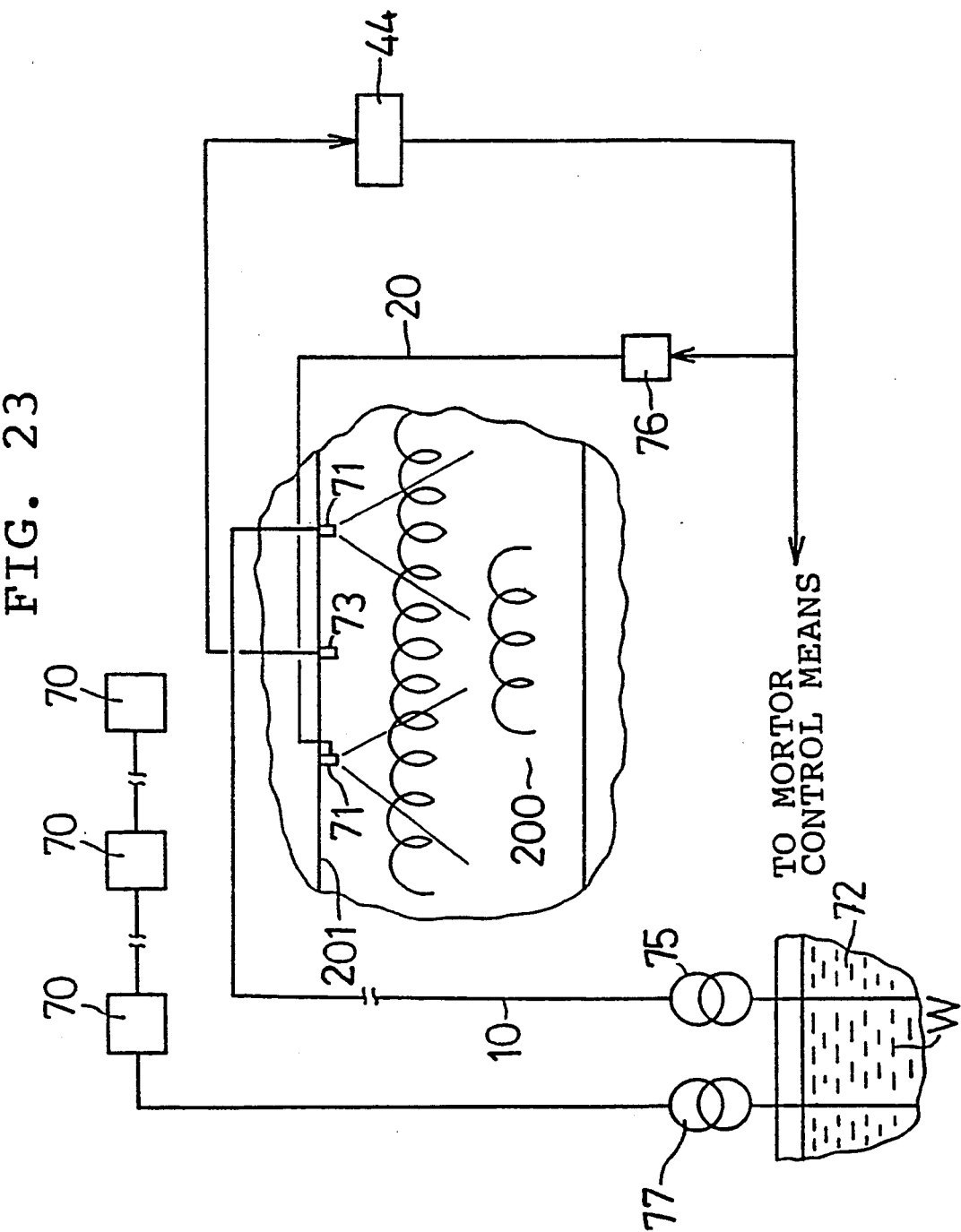
FIG. 23 illustrates a block diagram of a Tenth Preferred Embodiment (i.e., a fire-extinguishing and de-smoking apparatus) of an apparatus for descending micro floating particles according to the present invention.

The Tenth Preferred Embodiment will be hereinafter described with reference to FIG. 23. It is a fire-extinguishing and de-smoking apparatus used as fire-extinguishing equipment for buildins, and comprises nozzles 71, a thermal sensor 73, a judging means 44, a high voltage electric power source 76, a fire-extinguishing water tank 72, a sprinkler pump 75 a fire hydrant pump 77, and fire hydrants 70. The fire-extinguishing water tank 72, the sprinkler pump 75 and the fire hydrant pump 77 are used as a fire-extinguishing water supplying means in the Tenth Preferred Embodiment.

Specifically speaking, a lurality of the nozzles 71 is disposed on a ceiling portion 201 of a room 200. The nozzles 71 are for sprinkler equipment, and their valves are normally closed by built-in low melting point fuses. When a fire occurs and the low melting points fuses melt, the nozzles 71 spray fire-extinguishing water, which is held in piping 10 at a high pressure, into the room 200.

The piping 10 is connected to the fire-extinguishing water tank 72 by way of the sprinkler pump 75. The fire-extinguishing water tank 72 is in turn connected to a plurality of the fire hydrants 70 by way of the fire hydrant pump 77.

The fire-extinguishing water tank 72 holds a predetermined amount of the fire-extinguishing water with a cationic surface active agent added in an amount of 3 ppm. The fire-extinguishing water is replenished automatically through a float valve (not shown), and accordingly the cationic surface active agent is measured for its concentration and also replenished.

On the ceiling 201 of the room 200, the thermal sensor 73 is provided. The thermal sensor 73 always outputs signals to the judging means 44.

The judging means 44 includes a microcomputer apparatus, judges output currents from the thermal sensor 73 in order to detect a quantity of heat coming into the thermal sensor 73. When the quantity of heat exceeds a predetermined level, namely when the judging means 44 detects a flame whose intensity is a predetermined value or more, the judging means 44 outputs an operation signal to a motor control means (not shown) and the high voltage electric power source 76.

An output terminal of the high voltage electric power source 76 is connected to the nozzles 71 by way of an insulation-coated cable 20, The high voltage electric power source 76 outputs a high voltage, e.g., approximately 30 10 kv, to the nozzles 71, when the means 44 inputs the operation signal thereto. Here, the nozzles 71 are connected to the piping 10 while being interposed by teflon seals (not shown). Thus, the high voltage is applied to the nozzles 71 only.

The operation of the thus arranged fire-extinguishing and de-smoking apparatus will be hereinafter described. When a fire occurs in the room 200, the thermal sensor 73 outputs a signal designating an intensity of the fire to the judging means 44. When the intensity of the fire exceeds a predetermined level, the judging means 44 actuates the fire hydrant pump 77 in order to enable spraying and fire-extinguishing with the fire hydrants 70.

When the intensity of the fire further grows and the valves of the nozzles 71 open up, the fire-extinguishing water which is held in the 10 at a high pressure, is sprayed through the nozzles 71. When the spraying operation decreases the hydraulic pressure in the piping 10, a pressure sensor (not shown) disposed in the piping 10 detects the pressure drop. In accordance with the pressure drop, the motor control means (not shown) actuates the sprinkler pump 75 in order to maintain the hydraulic pressure in the piping 10.

The nozzles 71 and the fire hydrants 70 thus spray the fire-extinguishing water. The fire-extinguishing water vets parts of the room 200, and splashes over the inside of the room 200. Hence, water droplets thus splashed collect smoke particles and de-smoke the inside of the room 200.

In the operation, since the water droplets are charged positively to a high degree, they collect the smoke particles charged negatively with the electrostatic force. Also, the wall of the room 200 wetted by the water droplets collect the smoke particles favorably.

Further, since the cationic surface active agent is added to the water droplets in the amount of 3 ppm, the water droplets are more likely to wet the smoke particles than the water free from the cationic surface active agent. Accordingly, the smoke particles collectability of the water droplets has been improved remarkably. This is believed as follows: The addition of the cationic surface active agent decreases the surface tension of the water droplets, thereby improving the wettability of the water droplets.

In addition, an average particle diameter of the water droplets sprayed from the nozzles 71 depends on a spraying pressure and a configuration of the nozzles 71, however, it is preferred that the average particle diameter of most of the water droplets falls within a range of 0.01 to 1 min.

Moreover, the fire-extinguishing and de-smoking apparatus can be made movable. For instance, this apparatus can be installed on a fire engine in the following manner: A liquid tank storing a liquid including a surface active agent in a high concentration ( e.g., several percentages ) and a replenishing pump having a predetermined capacity are installed on a fire engine. When spraying, the liquid including a surface active agent is supplied to an inlet port (i. e., a low pressure port) of a spraying pump for fire-extinguishing with the replenishing pump. Consequently, the liquid including a surface active agent is diluted and sprayed from a hose of the fire engine. Thus, it is possible to effect the de-smoking described above.

As having been described so far, since the Tenth Preferred Embodiment (i.e., fire-extinguishing and de-smoking apparatus) sprays water with a surface active agent added in an amount of 0.1 to 3000 ppm, it is possible to de-smoke simultaneously with fire-extinguishing.

Having now fully described the present invention, it will be apparent to one of ordinary skill in the art that many changes and modifications can be made thereto without departing from the spirit or scope of the present invention as set forth herein.

What is claimed is:

1. A door including an apparatus for reducing smoke, the door comprising:
    a door body;
    at least one nozzle mounted upon said door body;
    a source of a de-smoking liquid; and
    means for connecting said at least one nozzle to said source of the de-smoking liquid.

2. The door of claim 1, wherein said source of the de-smoking liquid is located within said door body, and wherein said means for connecting said at least one nozzle to said source includes piping and at least one valve mounted on said door body.

3. The door of claim 1, further including a plurality of said nozzles.

4. The door of claim 1, wherein said door is an exit-entrance door for a human passageway.

5. The door of claim 4, wherein a plurality of said nozzles are provided at different height and width locations on said door.

6. The door of claim 1, wherein said source of the de-smoking liquid is a pressurized source.

7. A door for reducing smoke comprising:
    a door body;
    at least one nozzle mounted upon said door body;
    means for connecting said at least one nozzle to a source of a de-smoking liquid;
    wherein said source of the de-smoking liquid is located within said door body, and wherein said means for connecting said at least one nozzle to said source includes piping and at least one valve mounted on said door body;
    wherein said source of the de-smoking liquid includes a supply of pressurized water having a surface active agent in an amount of 0.1 to 3,000 ppm disposed in said supply of pressurized water.

8. A door for reducing smoke comprising:
    a door body;
    at least one nozzle mounted upon said door body;
    means for connecting said at least one nozzle to a source of a liquid; and
    the door further including a power source for supplying a voltage to said at least one nozzle.

9. The door of claim 8, wherein said source of the liquid is mounted within said door body, and wherein said means for connecting includes piping and at least one valve for connecting the at least one nozzle to said source of the liquid.

10. The door of claim 9, wherein said source of the liquid includes pressurized water with a cationic surface active agent in an amount pf 0.1 to 3,000 ppm disposed in the pressurized water contained within said source of the liquid.

11. A door for reducing smoke comprising:
    a door body;
    a plurality of nozzles mounted upon said door body;
    a pressurized water supply source mounted within said door body;
    piping connecting said pressurized water supply source to said plurality of nozzles; and
    an electric power source for providing a voltage to said plurality of nozzles.

12. The door of claim 11, wherein said pressurized water supply source includes water having a surface active agent in an amount of 0.1 to 3,000 ppm disposed therein.

13. The door of claim 12, wherein said surface active agent is a cationic surface active agent.

* * * * *